June 27, 1939.   H. GOURLEY   2,164,238
OILING ATTACHMENT FOR SAWS
Filed Sept. 24, 1937
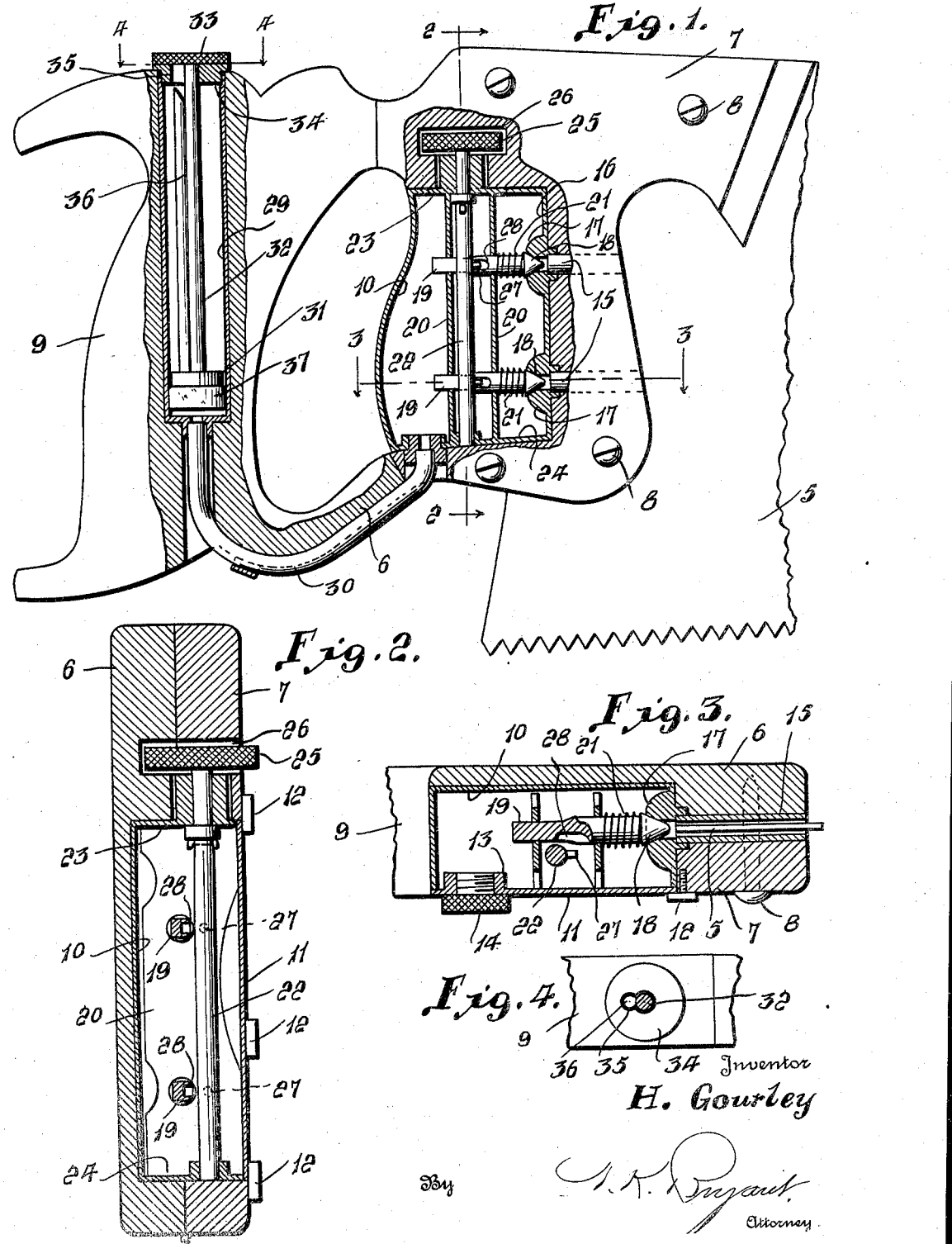
Inventor
H. Gourley
By
Attorney Patented June 27, 1939

2,164,238

UNITED STATES PATENT OFFICE 2,164,238

OILING ATTACHMENT FOR SAWS

Hillman Gourley, Whittier, Calif.

Application September 24, 1937, Serial No. 165,579

1 Claim. (Cl. 145—35)

This invention relates to certain new and useful improvements in an oiling attachment for saw handles and more particularly to saw handles of the ordinary hand saw type.

As is well understood, it is necessary to frequently lubricate a saw which operation has previously been done manually which interrupts the actual sawing operation and results in loss of time and efficiency.

Although there have previously been devices for releasing a small amount of lubricant on the saw, either by gravity or by a method equivalent to an oil can located in the handle of the saw, none of these devices provide for the release of the oil under a considerable air pressure so that the oil will be distributed over the whole length of the saw without stopping the actual sawing operation. For this reason all previous devices have little advantage over a manual lubrication of the saw blade.

The primary object of the invention is to provide an oiling attachment for various types of saws, such as hand, band or circular, wherein an oil receptacle is supported on the saw with oil in the receptacle under air pressure adapted to be automatically discharged onto the saw blade under control of manually operable means with the oil fed to the saw blade at the will of the operator.

A further object of the invention is to provide an oiling attachment for saws of the hand type wherein an oil receptacle is carried by the handle of the saw with oil from the receptacle discharged under air pressure to the saw blade during use of the saw whenever desired for the complete length of the saw blade.

With the above and other objects in view that will become apparent as the nature of the invention is better understood, the same consists in the novel form, combination and arrangement of parts hereinafter more fully described, shown in the accompanying drawing and claimed.

In the drawing:

Figure 1 is a fragmentary side elevational view, partly broken away and shown in section of the hand saw having the handle thereof constructed in accordance with the present invention and equipped with the oiling attachment for the saw blade;

Fig. 2 is a vertical cross-sectional view taken on line 2—2 of Figure 1;

Figure 3 is a fragmentary longitudinal sectional view taken on line 3—3 of Figure 1 showing a valve device for controlling the flow of oil from the oil receptacle onto the saw blade; and Figure 4 is a detail sectional view taken on line 4—4 of Figure 1.

Referring more in detail to the accompanying drawing, there is illustrated a hand saw, although it is to be understood that the oiling attachment may be applied to saws of other types, the hand saw illustrated comprising a blade 5 having a handle attached thereto at one end, the handle to be hereinafter described as comprising a body formed of two sections 6 and 7 secured together and to the saw blade that is interposed therebetween by means of cross screws 8. The handle further includes the usual hand grip 9.

The inner side of the body portion 6 of the handle is cut away as shown in Figures 2 and 3 to provide a pocket for the reception of an oil receptacle 10 having a removable cover wall 11 retained in position by headed screws 12 and said oil receptacle 10 is charged with oil through the filler boss 13 that is closed by a screw plug 14.

A pair of vertically spaced oil passages 15 extend from the oil receptacle 10 through the body sections 6 and 7 at opposite sides of the saw blade 5 as shown in Figure 3 to permit the feeding of oil from the receptacle 10 to the saw blade 5, the forward wall 16 of the oil receptacle 10 having a pair of valve seats 17 respectively registering with the oil passages 15 and said valve seats 17 are normally engaged by conical valves 18 on the ends of a pair of valve stems 19. A pair of spaced plates 20 is arranged in the oil receptacle 10 for the sliding support of the valve stems 19 and a coil spring 21 surrounds each valve stem 19 between one of the plates 20 and adjacent valve seat 17, the spring respectively engaging the adjacent plate 20 and valve 18 for influencing the valve toward its seat.

Means is provided for unseating the valves 18 to permit the flow of lubricant or oil from the receptacle 10 through the passages 15 onto the saw blade 5 and includes a rod 22 journaled in the top and bottom walls 23 and 24 respectively of the oil receptacle 10, the upper end of the rod 22 having a knurled operating head 25 that projects through a side opening 26 in the body portion 7 of the handle. A pair of pins 27 project laterally of the rod 22 and respectively align with the valve stems 19 to be received in side notches 28 of the valve stems for moving the latter against the tension of the springs 21 to unseat the valves 18 relative to the valve seats 17.

It is intended that the oil in the receptacle 10 be under air pressure so that when the valves 18 are unseated, oil will be automatically projected through the passages 15 onto the saw blade 5 and to provide such air pressure, the hand grip 9 has an air pump cylinder 29 set therein as shown in Figure 1, with an air tube connection 30 between the lower end of the pump cylinder 29 and the bottom wall 24 of the oil receptacle 10. A piston 31 reciprocable in the pump cylinder 29 is carried by a piston rod 32 that carries an exposed handle or operating button 33 at its upper end above the hand grip 9. A disk 34 is threaded into the upper end of the pump cylinder 29 and through which the piston rod 32 extends, said disk having an opening 35 therein laterally of the piston rod 32 for the passage of a rod 36 that extends downwardly and parallel with the piston rod 32 for attachment to the piston 31. When the piston 31 is at its limit of inward movement in the pump cylinder 29, the piston rod 32 and rod 36 are rotated by the button 33 to displace the upper end of the rod 36 laterally of the opening 35 and beneath the disk 34 for holding the piston 31 against movement, similar in operation to an air pump on a blow torch.

Mounted in the lower end of the cylinder 29 is a plug 37 containing a downwardly opening spring operated plunger valve permitting the flow of air in one direction into the chamber 10 and preventing the flow of air under pressure in the chamber 10 and conduit 30 back to the pump cylinder.

From the above detailed description of the invention, it is believed that the construction and operation thereof will at once be apparent, it being noted that the receptacle 10 is charged with oil through the filling boss 13 while the spring pressed valves 18 are normally engaged with their seats 17. The oil in the receptacle 10 is placed under air pressure by the operation of the pump carried by the hand grip 9 so that oil is forcibly projected from the receptacle 10 through the oil passages 15 onto the blade 5 when the tensioned valves 18 are unseated by rotating the rod 22 through the medium of the knurled head 25. Oil may be fed to the saw blade 5 whenever desired to facilitate operation thereof.

While there is herein shown and described the preferred embodiment of the invention, it is nevertheless to be understood that minor and major changes and all improvements may be made therein without departing from the spirit and scope of the invention as claimed.

I claim:

In an oiling attachment for saws of the character described, a saw blade and handle, a receptacle for oil and compressed air carried by the handle, valved controlled oil passages from the receptacle to the blade, means for opening the valves, an air pump carried by the handle in communication with the oil receptacle for placing the oil in the receptacle under pressure at all times, whereby the oil is forcibly projected through the passages when the valves are opened, the valved controlled passages including tensioned valve stems engageable with valve seats, supports for the valve stems and means for moving the valve stems against tension thereon for opening the oil passages to the saw blade, including a rod rotatably journalled in the oil receptacle, pins projecting laterally of the rod and the valve stems having abutment recesses for the pins receivable in the recesses upon rotation of the rod, said handle having a side opening recess therein in axial alinement with said rod, the upper end of the rod extending into said recess and a knurled head on the upper end of the rotatable rod within the recess and projecting outwardly and laterally of the handle for rotating the rod to operate the valves.

HILLMAN GOURLEY.